3,041,350
NEW ORGANOPHOSPHORUS COMPOUNDS DE-
RIVED FROM BIS(HALOMETHYL)OXETANES
AND THIETANES
Richard L. McConnell and Harry W. Coover, Jr., Kingsport, Tenn., assignors to Eastman Kodak Company, Rochester, N.Y., a corporation of New Jersey
No Drawing. Filed Sept. 10, 1959, Ser. No. 839,053
6 Claims. (Cl. 260—327)

This invention relates to new organophosphorus compounds and to a method for their preparation. In a specific aspect, this invention relates to new organophosphorus esters and to methods for their preparation. In another aspect this invention relates to new phosphorus-containing polymers and copolymers.

Many organophosphorus compounds have been found useful in recent years as insecticides, plasticizers, monomers for the preparation of polymers having unusual properties, as well as a variety of other uses. Accordingly, it is an object of this invention to provide new organophosphorus compounds that have outstanding insecticidal activity and are useful in the preparation of polymeric materials. It is another object of this invention to provide a novel method for preparing these new organophosphorus compounds.

In accordance with this invention we have prepared new organophosphorus compounds having the structural formula:

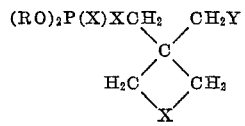

wherein R is a lower alkyl radical containing from 1 to 4 carbon atoms, X is selected from the group consisting of oxygen and sulfur and Y is a halogen selected from the group consisting of chlorine, bromine and iodine.

The compounds of this invention are prepared by reacting a dialkyl phosphorus ester having the structural formula:

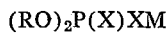

wherein R and X are as defined above and M is a radical selected from the group consisting of hydrogen, —NH₄ and alkali metals (sodium, potassium and lithium) with an oxetane or thietane having the structural formula:

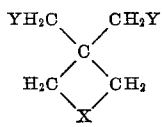

wherein X and Y are as defined above.

The reaction forming the compounds of this invention is usually carried out by slowly adding one of the reactants to the other reactant and any mode of addition of the reactants can be employed. The reaction is ordinarily carried out at a temperature within the range of 0 to 150° C. The molar ratio of reactants can be varied rather widely, but it is preferable to employ equal molar quantities of the reactants for the most desirable results. The reaction is usually conducted in a solvent medium and among the solvents that are employed are lower aliphatic alcohols, ketones and normally liquid hydrocarbons. Suitable solvents are normally liquid aliphatic and aromatic hydrocarbons such as pentane, hexane, heptane, octane, benzene, toluene and xylene and alcohols such as ethyl alcohol, propyl alcohol, isopropyl alcohol, butyl alcohol, isobuty alcohol, and the like. The period for reaction generally varies from about 1 to 8 hours.

The compounds of this invention and their preparation are described in the following examples:

Example 1.—O,O-Diethyl S-[(3-Chloromethyl-3-Oxetanyl)Methyl]Phosphorothiolothionate

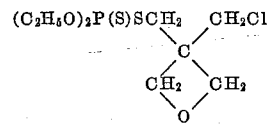

3,3-bis(chloromethyl) oxetane (0.1 mole) and the ammonium salt of diethyl phosphorothiolothionate (0.1 mole) were mixed in 150 ml. of absolute ethyl alcohol and heated to reflux with stirring for 4 hours. The precipitated ammonium chloride was filtered off and the solvent was removed under reduced pressure leaving the product as a transparent, straw-colored oil. $N_D^{20}$ 1.5302. Analysis.—Calcd. for $C_9H_{18}ClO_3PS_2$: P, 10.16. Found: P, 10.67. The infrared spectrum obtained on this compound was compatible with the proposed structure.

A similar product was obtained using the potassium and the sodium salt of diethyl phosphorothiolothionate rather than the ammonium salt.

Example 2.—O,O-Diisopropyl S-[(3-Bromomethyl-3-Oxetanyl)Methyl]Phosphorothiolate

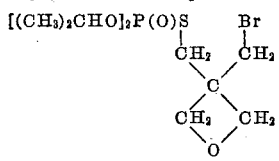

This compound was prepared from 3,3-bis(bromomethyl)oxetane (0.1 mole) and the sodium salt of diethyl phosphorothiolate (0.1 mole) in refluxing isopropyl alcohol according to the procedure of Example 1.

Example 3.—Diethyl (3-Chloromethyl-3-Oxetanyl) Methyl Phosphate

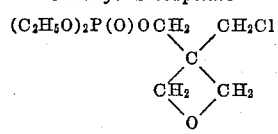

This compound was prepared from the sodium salt of diethyl phosphate (0.2 mole) and 3,3-bis(chloromethyl)-oxetane (0.2 mole) in refluxing ethyl alcohol according to the procedure of Example 1.

Example 4.—O,O-Dimethyl S-[(3-Chloromethyl-3-Thietanyl)Methyl]Phosphorothiolate

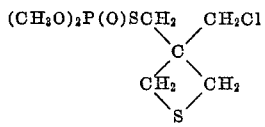

3,3-bis(chloromethyl)thietane (0.1 mole) and the potassium salt of dimethyl phosphorothiolate (0.1 mole) were reacted in refluxing methyl alcohol according to the procedure of Example 1.

Example 5.—O,O-Diethyl S-[(3-Iodomethyl-3-Oxetanyl)-Methyl]Phosphorothiolothionate

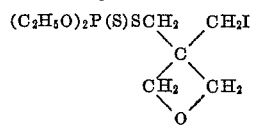

O,O-diethyl phosphorothiolothionate (0.1 mole), 3,3-bis(iodomethyl)oxetane (0.1 mole), and pyridine (0.1 mole) were mixed in 200 ml. of benzene and refluxed on the steam bath for 6 hours. After filtering off the pyridine hydroiodide, the benzene was evaporated, leaving the product as a transparent, viscous oil.

*Example 6.—Bulk Polymerization of Diethyl(3-Chloromethyl-3-Oxetanyl)Methyl Phosphate*

Diethyl(3-chloromethyl-3-oxetanyl)methyl phosphate (10 g.) was treated with 0.2 ml. of boron trifluoride etherate. The temperature of the reaction mixture rose to a maximum of about 75°. After standing for a short time, the polymer was opaque. The polymer was cured by heating at 150° in vacuo (0.1 mm.) to remove any volatile materials present. The solid polymer was triturated with ethyl ether and dried. The dried polymer is a white solid material with a softening point higher than 175° C. Flame-resistant fibers were drawn from the molten polymer and these were cold drawn to yield highly oriented specimens. The polymer was insoluble in the common solvents at 25° C. but it was soluble in hot chlorinated hydrocarbons, esters, and amines.

Similar polymers were obtained by polymerizing the products described in Examples 1, 2, 4, and 5 according to the process of Example 6.

*Example 7.—Solution Polymerization of O,O-Diethyl S-[(3 - chloromethyl - 3 - Oxetanyl)Methyl]Phosphorothiolothionate*

O,O-diethyl S-[(3-chloromethyl-3-oxetanyl)methyl]-phosphorothiolothionate (10 g.) and 10 ml. of $CH_2Cl_2$ were mixed with stirring. Boron trifluoride etherate (1 ml.) was added and the solution was refluxed gently. After a short time, a white pasty solid formed in the reaction mixture. The polymer was filtered off, washed with diethyl ether, and dried. The polymer was a white powder and had physical properties similar to those for the polymer described in Example 6. Similar polymers were obtained in diethyl ether, benzene, toluene, chloroform, and 1,2-dichloroethane.

*Example 8.—Copolymer of O,O-Dimethyl S-[(3-Chloromethyl-3-Thietanyl)Methyl]Phosphorothiolate and 3,3-Bis(Chloromethyl)Oxetane*

A mixture of O,O-dimethyl S-[(3-chloromethyl-3-thietanyl)methyl]phosphorothiolate (5 g.) and 3,3-bis-(chloromethyl)oxetane (5 g.) were polymerized in methylene chloride according to the procedure described in Example 7 to give a white solid polymer.

*Example 9.—Copolymer of O,O-Diethyl S-[(3-Iodomethyl-3-Oxetanyl)Methyl]Phosphorothiolothionate and 3,3-Bis(Chloromethyl)Oxetane*

A mixture of O,O-diethyl S-[(3-iodomethyl-3-oxetanyl)methyl]phosphorothiolothionate (2.5 g.) and 3,3-bis(chloromethyl)oxetane (7.5 g.) were polymerized in methylene chlorine according to the procedure described in Example 7 to give a white solid polymer.

*Example 10.—Copolymer of Diethyl (3-Chloromethyl-3-Oxetanyl)Methyl Phosphate and 3,3-Bis(Bromomethyl)Oxetane*

A mixture of diethyl (3-chloromethyl-3-oxetanyl)methyl phosphate (7.5 g.) and 3,3-bis(bromomethyl)oxetane (2.5 g.) were polymerized according to the procedure of Example 6 to yield a white solid polymer.

Although the invention has been described in considerable detail with reference to certain preferred embodiments thereof, variations and modifications can be effected within the spirit and scope of this invention as described hereinabove and as defined in the appended claims.

We claim:

1. The organophosphorus compounds having the structural formula:

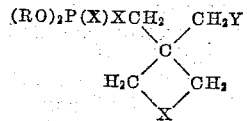

wherein R is a lower alkyl radical containing from 1 to 4 carbon atoms, X is selected from the group consisting of oxygen and sulfur and Y is a halogen selected from the group consisting of chlorine, bromine and iodine.

2. As a composition of matter, O,O-diethyl S-[(3-chloromethyl-3-oxetanyl)methyl]phosphorothiolothionate.

3. As a composition of matter, O,O-diisopropyl S-[(3-bromomethyl-3-oxetanyl)methyl]phosphorothiolate.

4. As a composition of matter, diethyl (3-chloromethyl-3-oxetanyl)methyl phosphate.

5. As a composition of matter, O,O-dimethyl S-[(3-chloromethyl-3-thietanyl)methyl]phosphorothiolate.

6. As a composition of matter, O,O-diethyl S-[(3-iodomethyl-3-oxetanyl)methyl]phosphorothiolothionate.

References Cited in the file of this patent

UNITED STATES PATENTS

| | | |
|---|---|---|
| 2,766,166 | Haubin | Oct. 9, 1956 |
| 2,769,013 | Lowenstein-Lom | Oct. 30, 1956 |
| 2,815,350 | Speck | Dec. 3, 1957 |
| 2,864,826 | Diveley | Dec. 16, 1958 |
| 2,871,202 | Scott | Jan. 27, 1959 |
| 2,891,915 | McCormack et al. | June 23, 1959 |

FOREIGN PATENTS

| | | |
|---|---|---|
| 832,230 | Great Britain | Apr. 6, 1960 |